US011259040B1

(12) United States Patent
Sabui et al.

(10) Patent No.: US 11,259,040 B1
(45) Date of Patent: Feb. 22, 2022

(54) ADAPTIVE MULTI-PASS RISK-BASED VIDEO ENCODING

(71) Applicant: Amazon Technologies, Inc., Seattle, WA (US)

(72) Inventors: Arko Sabui, Bangalore (IN); Deepthi Nandakumar, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 42 days.

(21) Appl. No.: 16/395,123

(22) Filed: Apr. 25, 2019

(51) Int. Cl.
*H04N 19/46* (2014.01)
*H04N 19/182* (2014.01)

(52) U.S. Cl.
CPC ........... *H04N 19/46* (2014.11); *H04N 19/182* (2014.11)

(58) Field of Classification Search
CPC .............................. H04N 19/46; H04N 19/182
See application file for complete search history.

(56) References Cited

U.S. PATENT DOCUMENTS

| | | | | |
|---|---|---|---|---|
| 8,948,529 B1* | 2/2015 | Maaninen | ............... | H04N 19/11 |
| | | | | 382/238 |
| 2004/0012675 A1* | 1/2004 | Caviedes | ............... | H04N 19/14 |
| | | | | 348/180 |
| 2006/0002611 A1* | 1/2006 | Mantiuk | ................ | H04N 19/30 |
| | | | | 382/239 |
| 2009/0323803 A1* | 12/2009 | Gomila | ................ | H04N 19/156 |
| | | | | 375/240.02 |
| 2011/0007968 A1* | 1/2011 | Yamada | ................. | H04N 17/00 |
| | | | | 382/165 |
| 2013/0124201 A1* | 5/2013 | Yamanashi | ........... | G10L 19/008 |
| | | | | 704/225 |
| 2014/0023266 A1* | 1/2014 | Bertheau | ................. | G06T 5/003 |
| | | | | 382/162 |
| 2014/0321534 A1* | 10/2014 | Su | ......................... | H04N 19/136 |
| | | | | 375/240.03 |
| 2015/0117516 A1* | 4/2015 | Bracha | ................. | H04N 19/192 |
| | | | | 375/240.02 |
| 2015/0304674 A1* | 10/2015 | Lee | ......................... | H04N 19/46 |
| | | | | 382/232 |
| 2015/0356374 A1* | 12/2015 | Mase | .................... | G06K 9/4671 |
| | | | | 382/195 |
| 2017/0078376 A1* | 3/2017 | Coward | ............... | H04N 19/436 |
| 2017/0372467 A1* | 12/2017 | Carmel | ................. | G06T 7/0002 |
| 2018/0098084 A1* | 4/2018 | Chesnokov | ............ | H04N 19/59 |
| 2018/0367799 A1* | 12/2018 | Carmel | .................. | H04N 19/50 |
| 2019/0045142 A1* | 2/2019 | Zivkovic | ............ | H04N 5/23229 |
| 2020/0204804 A1* | 6/2020 | Chen | ....................... | H04N 19/14 |
| 2020/0244997 A1* | 7/2020 | Galpin | ..................... | G06N 3/08 |

\* cited by examiner

*Primary Examiner* — Anner N Holder
(74) *Attorney, Agent, or Firm* — Eversheds Sutherland (US) LLP

(57) ABSTRACT

Devices and methods are provided for adaptive multi-pass risk-based video encoding. A device may receive a segment of video frames encoded using first encoding parameters. The device may determine a group of pixels in a first video frame of the video frames. The device may determine characteristics associated with the group of pixels and may determine, based on the characteristics and a number of pixels in the group of pixels, a score associated with the segment, wherein the score is indicative of a visibility of banding compression artifact. The device may determine, based on the score, second encoding parameters associated with encoding the segment.

20 Claims, 6 Drawing Sheets

ADAPTIVE MULTI-PASS RISK-BASED VIDEO ENCODING

BACKGROUND

Playable digital media such as video and audio may be formatted to be compatible for use with computer media players. Because different devices and software may use different media formats, media may be encoded based on a respective format. The encoding of video may be a lossy process involving compression of video data for storage and transmission. Increasing the strength of compression applied to video data in an encoding process may result in higher risk of visible compression artifacts, which undermine the quality of video presentation to a viewer. Higher definition video viewed on larger displays may exacerbate compression artifacts, especially when the video is compressed significantly during encoding. However, encoding higher definition video with low strengths of compression may result in inefficient transmission and storage of larger bitstreams of data.

Figure 1:
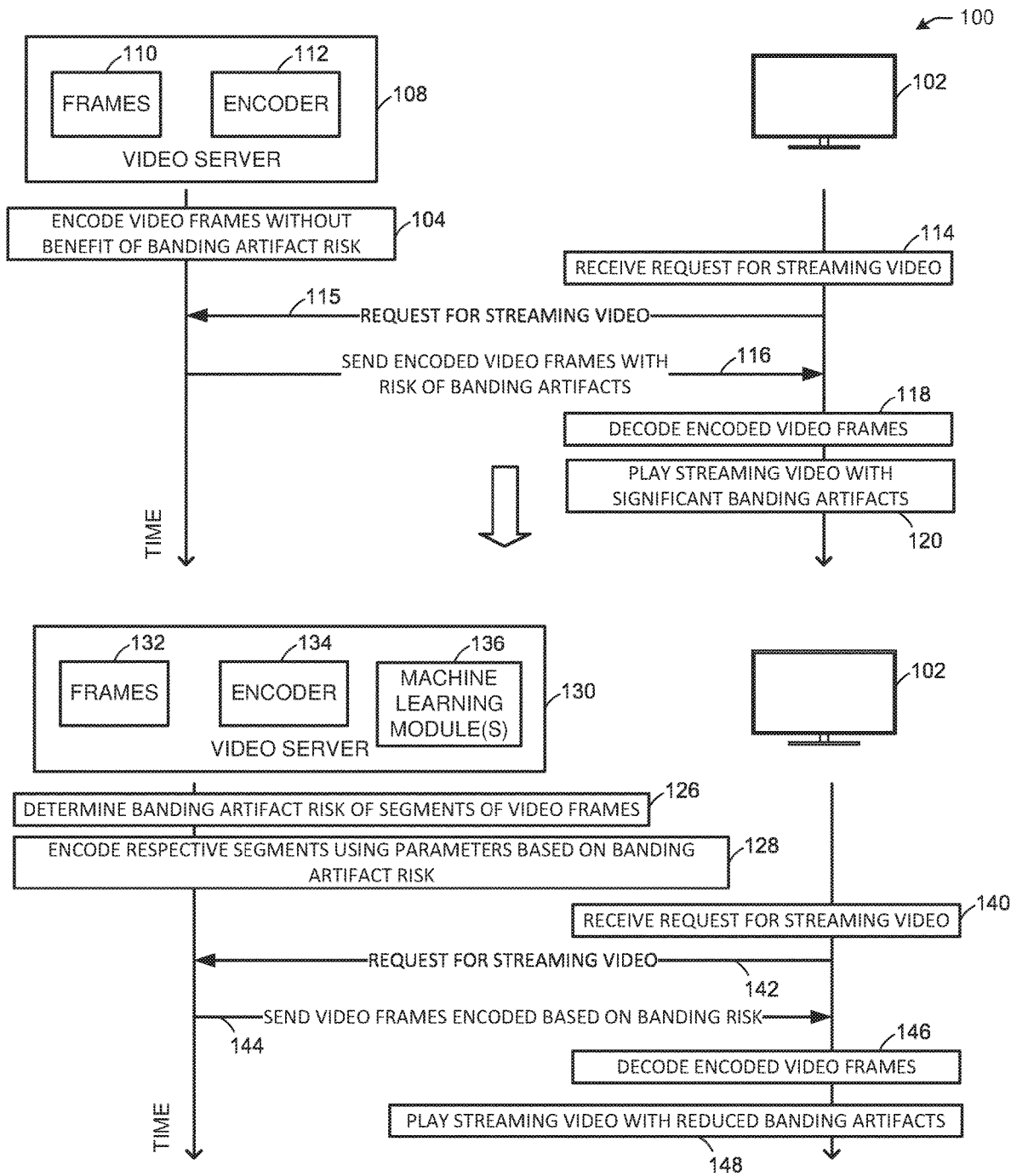
FIG. 1 illustrates an example process for adaptive multi-pass risk-based video encoding, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for adaptive multi-pass risk-based video encoding.

Video and other media may be encoded using different strengths of compression in order to reduce the amount of information transmitted and stored by devices. A device may encode video by compressing video data (e.g., pixel data) using different parameters and strengths of compression to play using different parameters and display sizes. Some examples of video coding standards include H.265 (high efficiency video coding—HEVC), H.264/MPEG-4, H.263, MPEG-3, MPEG-2, MPEG-1, and other video coding standards which define parameters for computers to encode and decode video data. A more aggressive encoding scheme may include more significant compression, and therefore more loss of video data, than a less aggressive encoding scheme. Therefore, a more aggressive encoding scheme may result in less quality video data than a less aggressive encoding scheme. Compression artifacts may be more visible when lower quality video data is rendered on a larger or higher quality display, for example.

Devices may balance storage and transmission constraints with video quality concerns when selecting video encoding parameters to use. For example, devices may encode video adaptively by changing encoding parameters based on the content being encoded, device constraints, network constraints, and other considerations. One example of adaptive video encoding includes encoding at a segment level (e.g., segment adaptive encoding) in which different segments of a same video file may be encoded differently.

Playable video files may include frames of video (e.g., images constructed using pixel data indicating what is to be displayed at a given location of an image). Video files may be divided into segments (e.g., groups of video frames). For example, a segment may correspond to a period of time, such as a given scene or time when a camera is focused on a particular area, object, or person. To account for different display types and connection capabilities, a device may encode video frames or segments of video frames in different formats. For example, a segment of video frames may be encoded with low-resolution parameters, and another segment of video may be encoded with high-definition parameters. A higher definition video segment may include more data than the corresponding lower resolution segment. When a network connection is slow, a lower definition segment of video frames for a video file may be downloaded and played, and when a network condition is fast, a higher definition segment may be downloaded and played. Therefore, when streaming a video file, different segments of the video file encoded with different parameters may be downloaded and played.

Network connection capability may not be the only consideration when determining which version of a video segment (e.g., a more aggressively encoded version or a less aggressively encoded version) to stream. Because increased compression (e.g., more aggressive encoding) may result in more visual compression artifacts, a device may stream a less aggressively encoded video segment to reduce the risk of displayed visual compression artifacts. Visual compression artifacts may include banding, ringing, contouring, blocking, blurring, color bleeding, flickering, jerking, and other types of compression artifacts. Banding may refer to when colors and gradients are not accurately displayed due to data loss from compression. Quantization of pixel values, particularly in regions of low lighting or gentile lighting gradients, may result in visible banding. Encoding quantization may change a continuous pixel gradient into discrete values, thereby creating bands or false contours, especially with more aggressive encoding parameters with an increased quantization step and lower overall bitrate. Encoding more aggressively may result in more banding effects, but encoding less aggressively may result in more data to stream and store.

Some general purpose video quality metrics may not measure banding and contouring artifacts accurately, especially in video image regions without much light. If a video quality metric does not identify banding accurately, then a device may underestimate the effects that encoding may have on creating a banding artifact, and therefore the device may encode more aggressively. However, devices may encode less aggressively to minimize visual artifacts such as banding.

Rather than encoding video files using a less-lossy compression because the risk that some video frames may experience banding, a segment adaptive encoding method may benefit from multi-pass risk-based encoding which accounts for the risk of artifacts in individual frames or segments of frames. Using such an enhanced risk-based encoding process may result in improved transmitting, storing, and display of video data on devices, thereby improving the performance of a device with respect to processing and memory resources, and with respect to efficiently presenting data with reduced risk of visual artifacts while balancing the risks and benefits of using more or less aggressive encoding of video data.

Therefore, the encoding, transmission, storage, and playback of video using computers may be improved using a risk-based approach which accounts for the risk of banding and other compression artifacts in individual video frames or segments.

In one or more embodiments, a neural network such as a convolutional neural network may operate with a video encoder (e.g., a processor) to assess the compressed artifact risk of video segments and determine which encoding parameters to apply (e.g., more aggressive or less aggressive parameters) based on the risk. The neural network may receive video frames encoded by the encoder (e.g., a first pass of video encoding), may determine the risk of a coded video segment having an artifact, and may recommend encoding parameters for a second round of encoding of the video segments (e.g., a second pass of video encoding) based on the risk.

In one or more embodiments, the neural network may analyze any one or more frames of a segment of a video file. The neural network may be trained, for example, by receiving user inputs indicating the visibility of banding and other artifacts in a given video frame or segment. Once trained, the neural network may analyze video frames without additional user input to determine an index indicative of the visibility of an artifact in a video frame or segment. For example, the neural network may analyze a video frame of a segment of video frames, and based on the index, may assign a score indicative of the quality of the video segment based on the quality of the analyzed video frame of the segment (e.g., a higher score may indicate a higher quality image with less visibility of one or more artifacts).

In one or more embodiments, the neural network may identify (e.g., using a traversal algorithm or otherwise) contiguous "islands" or groups of pixels with the same or similar luminance and having a banding risk (e.g., a risk of banding which exceeds a risk threshold). The fraction of a video frame susceptible to banding or other artifacts may be assigned a banding index (or another respective index associated with the type of artifact). The neural network may assign the banding index or other index, and may determine whether the index exceeds a threshold (e.g., risk threshold associated with a type of artifact). When the index of an encoded video frame exceeds a respective artifact risk threshold, the neural network may classify the segment as higher risk. When the index of an encoded video frame does not exceed a respective artifact risk threshold, the neural network may classify the segment as lower risk. The neural network may use multiple thresholds (e.g., for high, medium, and low risks) to classify segments of video frames based on the respective index of a frame in a respective video segment. The neural network may provide the encoder with the risk classifications, and the encoder may select encoding parameters for a second pass of encoding the video segments based on the risk classifications for one or more artifacts.

In one or more embodiments, the neural network and one or more encoders may be part of a video pipeline used by one or more servers (e.g., a remote network provider) which provide streaming video. The neural network may analyze segments of encoded video while other segments of the same video file are still being encoded in a first pass, or the neural network may wait to assess encoded video segments after all segments of a video file have been encoded. The encoder may encode coded video segments a second time based on the risk assessment or recommended encoding parameters provided by the neural network while the neural network assesses video segments which have been encoded by the encoder in a first pass, or the encoder may wait until the neural network has assessed the artifact risk of all segments of a video file after a first pass of encoding before encoding the video segments with a second pass using the risk-based encoding parameters. Once video segments have been encoded twice using the risk-based approach, the video segments may be transmitted using the video pipeline to one or more devices capable of receiving and playing the streaming video.

In one or more embodiments, the neural network may determine a banding index of a video segment based on an analysis of one or more variables of a video frame in the segment. For example, the visibility of a banding artifact may correspond to the size of a pixel block or island with the same or similar luminance (e.g., intensity), and/or may correspond to the brightness (e.g., amplitude and wavelength) of the pixel block or island which may be subject to banding. The neural network may determine that larger, less bright islands of pixels in a video frame may correspond to increased chance of visibility of a banding artifact, and may assign a video segment having the video frame an index indicative of a higher banding visibility (e.g., a score between 0 and 1, with 1 being the highest risk of banding visibility). When a video segment has a higher banding index, the neural network may recommend or select a less-lossy set of encoding parameters to use in a second encoding pass than when a video segment has a lower banding index.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for adaptive multi-pass risk-based video encoding, in accordance with one or more example embodiments of the present disclosure.

Referring to FIG. 1, the process 100 may include a device 102, which may receive and play streaming video. At step 104, a video server 108 may encode video frames without benefit or consideration of a banding artifact risk. The video server 108 may have video frames 110, which may be played by the device 102. Before transmitting the video frames 110 to the device 102, the video server 108 may encode the video frames 110 at step 104 using a video encoder 112. The device 102 may receive, at step 114, a request for streaming video, and at step 115 may send a request for streaming video to a video server 108. The encoding parameters used by the encoder 112 may not be based on an assessment of banding artifact or other artifact risk at step 104 (e.g., the encoding may be based on network conditions or type of display, but may not determine how much data compression to use based on how much banding artifact risk may occur). At step 116, the video server 108 may send encoded video frames with a significant risk of banding artifacts because the encoding parameters used to encode the video frames 110 may not have been selected based on the banding artifact risk of the video frames 110 (e.g., the video frames 110 may have been compressed significantly enough to increase the risk of banding artifacts). At step 118, the device 102 may decode the encoded video frames. At step 120, the device 102 may play streaming video using the decoded video frames, and the playback may experience significant banding artifacts because the encoding parameters used at step 114 may not have accounted for or properly assessed the banding artifact risk of encoding the video frames 110.

Still referring to FIG. 1, at step 126, the one or more machine learning modules 136 may determine a banding risk of segments of the video frames 132 (e.g., segments of a video file). At step 126 a video server 130 may encode respective segments of video frames 132 using encoding parameters selected based on the banding risk of the respective segments. For example, segments with a higher risk of banding artifacts (e.g., a banding risk higher than a risk threshold) may be encoded with less aggressive encoding parameters, and segments with a lower risk of banding artifacts may be encoded with more aggressive encoding parameters. At step 140, the device 102 may receive a request for streaming video, and may send a request for the streaming video at step 142 to a video server 130. The video server 130 may differ from the video server 108 in that the video server may include not only video frames 132 and a video encoder 134, but also may include one or more machine learning modules 136 (e.g., associated with a neural network). At step 144, the video server 130 may send video frames encoded based on the banding risk to the device 102. At step 146, the device 102 may decode the encoded video frames, and at step 148, the device 102 may play streaming video with reduced banding artifacts.

In one or more embodiments, the one or more machine learning modules 136 (e.g., a convolutional neural network) may assess the compressed artifact risk of video segments and determine which encoding parameters to apply (e.g., more aggressive or less aggressive parameters) based on the risk. The one or more machine learning modules 136 may receive video frames encoded by the encoder 134 (e.g., a first pass of video encoding), may determine the risk of a coded video segment having an artifact, and may recommend encoding parameters for a second round of encoding of the video segments (e.g., a second pass of video encoding) based on the risk.

In one or more embodiments, the one or more machine learning modules 136 may analyze any one or more of the video frames 132 of a segment of a video file. For example, the encoder 134 may encode the frames 132 on a first pass, and the one or more machine learning modules 136 may analyze the encoded frames for banding artifacts before the encoder 134 encodes the frames in a second pass. Step 126 may include the one or more machine learning modules 136 determining banding risk of already encoded frames, and step 128 may include encoding the encoded frames again with settings selected based on the banding risk of frames or segments.

In one or more embodiments, the one or more machine learning modules 136 may identify contiguous islands or groups of pixels with the same or similar luminance and having a banding risk. The fraction of a video frame susceptible to banding or other artifacts may be assigned a banding index (or another respective index associated with the type of artifact). The one or more machine learning modules 136 may assign the banding index or other index, and may determine whether the index exceeds a threshold (e.g., risk threshold associated with a type of artifact). When the index of an encoded video frame exceeds a respective artifact risk threshold, the one or more machine learning modules 136 may classify the segment as higher risk. When the index of an encoded video frame does not exceed a respective artifact risk threshold, the one or more machine learning modules 136 may classify the segment as lower risk. The one or more machine learning modules 136 may use multiple thresholds (e.g., for high, medium, and low risks) to classify segments of the video frames 132 based on the respective index of a frame in a respective video segment. The one or more machine learning modules 136 may provide the encoder 134 with the risk classifications, and the encoder 134 may select encoding parameters for a second pass of encoding the video segments based on the risk classifications for one or more artifacts. Once video segments have been encoded twice using the risk-based approach, the video segments may be transmitted at step 144 to the device 102.

In one or more embodiments, step 126 may include the one or more machine learning modules 136 determining a banding index of a video segment based on an analysis of one or more variables of a video frame in the segment. For example, the visibility of a banding artifact may correspond to the size of a pixel block or island with the same or similar luminance (e.g., intensity), and/or may correspond to the brightness (e.g., amplitude and wavelength) of the pixel block or island which may be subject to banding. The one or more machine learning modules 136 may determine that larger, less bright islands of pixels in a video frame may correspond to increased chance of visibility of a banding artifact, and may assign a video segment having the video frame an index indicative of a higher banding visibility (e.g., a score between 0 and 1, with 1 being the highest risk of banding visibility). When a video segment has a higher banding index, the neural network may recommend or select a less-lossy set of encoding parameters to use in a second encoding pass than when a video segment has a lower banding index. The visibility of an artifact may not be limited to pixel brightness, and may be measured based on respective characteristics of pixels in a group of pixels. For example, mean brightness of pixels, pixel variance, edge characteristics (e.g., sharp pixel edges), pixel contrast, and other pixel characteristics may be considered when identifying an artifact and measuring the visibility of the artifact.

Figure 2:
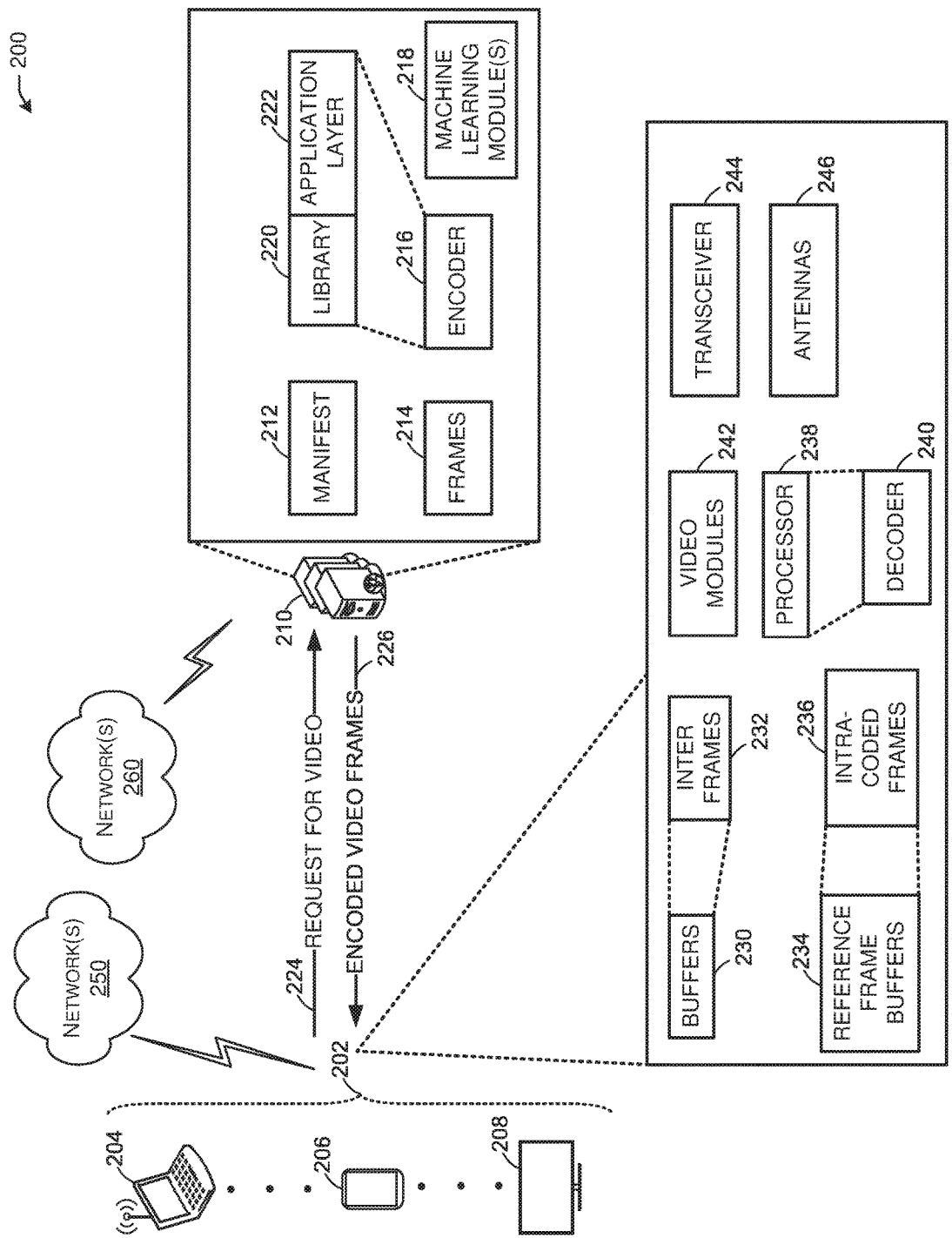
FIG. 2 illustrates a system for adaptive multi-pass risk-based video encoding, in accordance with one or more example embodiments of the present disclosure.

FIG. 2 illustrates a system 200 for adaptive multi-pass risk-based video encoding, in accordance with one or more example embodiments of the present disclosure.

Referring to FIG. 2, the system 200 may include one or more user devices 202 (e.g., user device 204, user device 206, user device 208) which may be capable of requesting, receiving, and playing video provided by a video server 210. The video server 210 may include a manifest 212, which may provide details of available video files and formats which the one or more user devices 202 may request and receive. The video server 210 may include video frames 214 for playback, an encoder 216 (which may be one or multiple encoders—different encoders may encode video during different encoding passes, for example), and a one or more machine learning modules 218 (which may be one or more multiple neural networks). The encoder 216 may include a library 220 and an application layer 222.

Still referring to FIG. 2, the one or more devices 202 may send a request 224 for video, and may receive 226 encoded video frames (e.g., video frames encoded by the encoder 216) from the video server 210. The one or more user devices 202 may include buffers 230, which may store inter frames 232 of video received from the video server 210. The one or more user devices 202 may include reference frame buffers 234, which may store intra-coded frames 236 of encoded video received from the video server 210. The one or more user devices 202 may include a processor 238, which may have a decoder 240 to decode encoded video frames. The processor 238 may cause playback of decoded video frames. The one or more user devices 202 may include one or more video modules 242, which may facilitate the reception of video selections and requests and may cause a transceiver 244 to facilitate transmissions using antennas 246.

In one or more embodiments, the one or more machine learning modules 218 may include a convolutional neural network capable of communicating with the encoder 216. The one or more machine learning modules 218 may use a machine learning algorithm, which may include a deep-learning algorithm. The machine learning algorithm may include a convolutional neural network. Convolutional neural networks may refer to a class of deep, feed-forward artificial neural networks, and may use a variation of multilayer perceptrons designed to require minimal preprocessing. The one or more machine learning modules 218 may receive encoding data from the encoder 216 (e.g., encoding logs indicating the encoding parameters used on any encoded video and/or pixel characteristics of encoded pixels), and may assess whether the encoding parameters used on encoded video resulted in increased or decreased compression artifact visibility. The one or more machine learning modules 218 may adjust video coding parameters used by the encoder 216 (e.g., by adjusting encoding profiles) to encode more aggressively or less aggressively based on the risk of more aggressive encoding causing banding or other compression artifacts.

In one or more embodiments, the one or more machine learning modules 218 may operate with the encoder 216 (e.g., a processor) to assess the compress artifact risk of video segments and determine which encoding parameters to apply (e.g., more aggressive or less aggressive parameters) based on the risk. The one or more machine learning modules 218 may receive video frames encoded by the encoder 216 (e.g., a first pass of video encoding), may determine the risk of a coded video segment having an artifact, and may recommend encoding parameters for a second round of encoding of the video segments (e.g., a second pass of video encoding) based on the risk.

In one or more embodiments, the one or more machine learning modules 218 may analyze any one or more of the video frames 214 of a segment of a video file. For example, the encoder 216 may encode the frames 214 on a first pass, and the one or more machine learning modules 218 may analyze the encoded frames for banding artifacts before the encoder 216 encodes the frames in a second pass.

In one or more embodiments, the one or more machine learning modules 218 may identify contiguous islands or groups of pixels in a video frame with the same or similar luminance and having a banding risk. The fraction of a video frame susceptible to banding or other artifacts may be assigned a banding index (or another respective index associated with the type of artifact). The one or more machine learning modules 218 may assign the banding index or other index, and may determine whether the index exceeds a threshold (e.g., risk threshold associated with a type of artifact). When the index of an encoded video frame exceeds a respective artifact risk threshold, the one or more machine learning modules 218 may classify the segment as higher risk. When the index of an encoded video frame does not exceed a respective artifact risk threshold, the one or more machine learning modules 218 may classify the segment as lower risk. The one or more machine learning modules 218 may use multiple thresholds (e.g., for high, medium, and low risks) to classify segments of the video frames 214 based on the respective index of a frame in a respective video segment. The one or more machine learning modules 218 may provide the encoder 216 with the risk classifications, and the encoder 216 may select encoding parameters for a second pass of encoding the video segments based on the risk classifications for one or more artifacts. Once video segments have been encoded twice using the risk-based approach, the video segments may be transmitted to the one or more devices 202.

In one or more embodiments, the one or more machine learning modules 218 may determine a banding index of a video segment based on an analysis of one or more variables of a video frame in the segment. For example, the visibility of a banding artifact may correspond to the size of a pixel block or island with the same or similar luminance (e.g., intensity), and/or may correspond to the brightness (e.g., amplitude and wavelength) of the pixel block or island which may be subject to banding. The one or more machine learning modules 218 may determine that larger, less bright islands of pixels in a video frame may correspond to increased chance of visibility of a banding artifact, and may assign a video segment having the video frame an index indicative of a higher banding visibility (e.g., a score between 0 and 1, with 1 being the highest risk of banding visibility). When a video segment has a higher banding index, the neural network may recommend or select a less-lossy set of encoding parameters to use in a second encoding pass than when a video segment has a lower banding index.

In one or more embodiments, the encoder 216 may be able to encode the video frames 214 using a variety of parameters. For example, the encoder 216 may be able to encode the video frames 214 according to H.265 (high efficiency video coding—HEVC), H.264/MPEG-4, H.263, MPEG-3, MPEG-2, MPEG-1, and other video coding standards which define parameters for computers to encode and decode video data. The encoder 216 may include the library 220 and the application layer 222. A video workflow may call a video coding executable (e.g., an H.265 executable), and the library 220 may receive the corresponding encoding parameters from the application layer 222. The encoder 216 may determine optimal reference frame placement (e.g., instantaneous decoder refresh frames) within one or more segments of the video frames 214. For example, the encoder 216 may optimize the alignment of a segment boundary with an actual scene boundary. An encoding analysis pass (e.g., a first pass in an encoding pipeline) may identify scene boundaries, and the encoder 216 may determine the optimal placement of instantaneous decoder refresh (IDR) frames, using scene boundary information from the first pass as well as a minimum/maximum keyframe (e.g., intra-coded frame) criteria. Intra-coded frames (e.g., I-frames) may be decoded without reference to any other frame but themselves. Inter frames may include predicted P-frames and bi-directional B-frames, which may be decoded based on one or more other frames and may require fewer bits than I-frames. A P-frame may rely on the decoding of a prior frame. A B-frame may require decoding of subsequent frames, and may or may not be used as reference frames for the decoding of other frames.

In one or more embodiments, the one or more devices may store the inter frames 232 in the buffers 230, and may store the intra-coded frames 236 in the reference frame buffers 234. The inter frames 232 may be used as reference frames to facilitate the decoding of the intra-coded frames 236. The video frames 214 may include IDR frames, which may clear the contents of the buffers 230. Any of the frames 214 sent after an IDR frame may reference any of the frames 214 sent before the IDR frame. An IDR frame is an I-frame, but an I-frame does not have to be an IDR frame. IDR frames and other inter frames 232 may be used to signal a new scene or segment of a video file. The banding index determined by the encoder 216 of the video server 210 may be based on pixel data of an intra-coded frame in a segment, or based on an inter frame. The decoder 240 may decode frames from the buffers 230 and from the reference frame buffers 234 to cause playback of decoded video frames.

In one or more embodiments, the one or more user devices 202 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The one or more user devices 202 may be configured to communicate via the communications network 250, wirelessly or wired. The video server 210 may be configured to communicate via the communications network 260, wirelessly or wired. The communications network 250 and/or the communications network 260 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 250 and/or the communications network 260 may have any suitable communication range associated therewith and may include, for example, global networks (e.g., the Internet), metropolitan area networks (MANs), wide area networks (WANs), local area networks (LANs), or personal area networks (PANs). In addition, the communications network 250 and/or the communications network 260 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more user devices 202 may include one or more communications antennas 246. The one or more communications antennas 246 may be any suitable type of antennas corresponding to the communications protocols used by the one or more user devices 202. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the one or more user devices 202.

The one or more user devices 202 may include any suitable radio and/or transceiver 244 for transmitting and/or receiving radio frequency (RF) signals in the bandwidth and/or channels corresponding to the communications protocols utilized by any of the one or more user devices 202 to communicate with the video server 210. The radio components may include hardware and/or software to modulate and/or demodulate communications signals according to pre-established transmission protocols. The radio components may further have hardware and/or software instructions to communicate via one or more cellular protocols, Wi-Fi and/or Wi-Fi direct protocols, as standardized by the Institute of Electrical and Electronics Engineers (IEEE) 802.11 standards, or other communication protocols.

In one or more embodiments, the one or more machine learning modules 218 may receive human inputs indicating the visibility of banding or other artifacts in the video frames 214. The one or more machine learning modules 218 may combine the human inputs with the determined visibility of banding artifacts to be trained to identify the artifacts and their visibility. After being trained using the human inputs, the one or more machine learning modules 218 may train itself to identify thresholds and criteria used to identify artifacts and to evaluate the visibility of the artifacts. The one or more machine learning modules 218 may include multiple layers. For example, a convolutional layer may include neurons to process data for a field. One or more layers may combine the outputs of neurons into a single neuron. The one or more machine learning modules 218 may determine outputs of neurons using a function that the one or more machine learning modules 218 learns by adjusting weights and input values of the function. For example, the human inputs may include annotations indicating areas of video frames exhibiting visible compression artifacts.

In one or more embodiments, the one or more machine learning modules 218 may learn parameters such as a minimum block size (e.g., a minimum number of pixels) and a range of luma/brightness values where banding or other compression artifacts are most visible. The one or more machine learning modules 218 may identify when groups of pixels meet the minimum block size (e.g., a threshold number of pixels) and a range of luma/brightness values. When a group of pixels in a frame meet the minimum block size and exhibit a luma/brightness value (e.g., using an average luma/brightness value of the pixels in a pixel block, considering each pixel brightness of pixels in a group, or a combination of at least some pixel brightness values in a group) within a range of luma/brightness values which the one or more machine learning modules 218 has identified as having a banding or other compression artifact risk exceeding a risk threshold, the one or more machine learning modules 218 may determine that a frame and its associated segment may have a banding or other compression artifact risk exceeding the risk threshold. The one or more machine learning modules 218 hyperparameters to determine the criteria for identifying compression artifacts. The hyperparameters may include video quality metrics such as peak signal-to-noise ratio and structural similarity (e.g., measuring image quality degradation caused by compression) may be considered by the one or more machine learning modules 218 in addition to compression artifact risk when identifying the compression risk profile of a segment to determine which encoding parameters to apply in a second pass.

In one or more embodiments, the one or more machine learning modules 218 may facilitate synchronization of keyframes (e.g., keyframes may be used at the beginning of a scene/segment). The one or more machine learning modules 218 may leverage the first encoding pass to identify scenes/segments, and to classify the scenes/segments according to their artifact risk. The one or more machine learning modules 218 may weigh accuracy and speed of processing when determining the frequency with which to sample frames encoded in a first pass for compression artifact risk (e.g., the more frames analyzed by the one or more machine learning modules 218, the more accurate the compression risk assessment, but the longer the time needed for processing and the more processing resources required). The one or more machine learning modules 218 may tune hyperparameters such as dropout for regularization, batch size, magnitude of gradient clipping, and learning rate based on machine learning applied to the identification of compression banding risk.

Figure 3:
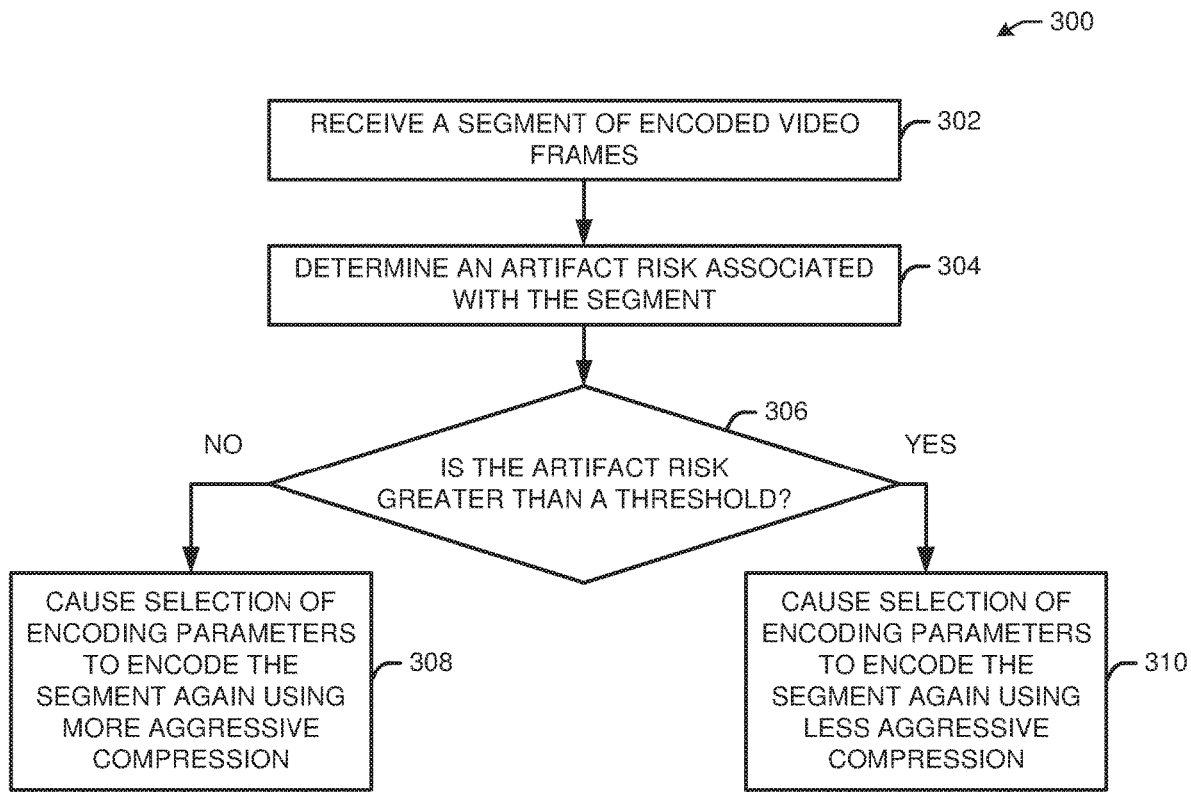
FIG. 3 illustrates a flow diagram for a process for adaptive multi-pass risk-based video encoding, in accordance with one or more example embodiments of the present disclosure.

FIG. 3 illustrates a flow diagram for a process 300 for adaptive multi-pass risk-based video encoding, in accordance with one or more example embodiments of the present disclosure.

At block 302, a device (e.g., the one or more machine learning modules 218 of FIG. 2) may receive encoded video frames (e.g., the frames 214 encoded by the encoder 216 of FIG. 2) and/or video data such as pixel values or characteristics of encoded video frames of a video segment. Video data may be associated with an encoded portion of a video segment encoded using first encoding parameters, and the encoded portion of the video segment may include a one or more video frames. The frames may have been encoded in a first pass, and the device may analyze the encoded frames for further encoding before the encoded frames are sent to one or more devices (e.g., the one or more devices 202 of FIG. 2) for playback. The device may receive multiple segments of video, which may correspond to a video file (e.g., a movie or show). A segment may correspond to a scene, a camera angle, or some amount of frames which may include one or more reference frames to facilitate decoding of one or more inter frames. The device may receive one or more encoded segments while other segments are being encoded in a first pass, or may receive encoded segments after all segments of a file have been encoded in a first pass.

At block 304, the device may determine an artifact risk associated with an encoded segment. For example, the device may determine the risk that a banding artifact may be visible in one or more frames of an encoded segment. To determine the artifact risk, the device may look for groups of adjacent pixels having any combination of brightness or other pixel characteristics and a large number of pixels to determine whether a banding artifact may be significantly visible in a segment when the segment is decoded and rendered. The artifact risk may be indicated by a banding index which may indicate the level of visibility of a banding artifact. Less bright, larger groups of pixels may be more susceptible to gradients and false contours, thus a higher banding index may indicate a higher likelihood of visibility of a banding artifact (e.g., the banding index may be between 0 and 1, with 1 being the highest visibility). Groups of pixels having a means brightness larger than a brightness threshold may have a higher likelihood of visibility of a banding artifact. High contrast and/or edge sharpness of pixels in a pixel group may be indicative of visibility of a banding artifact. The device may analyze one or more frames in a segment to determine an artifact risk of an entire segment. For example, a reference frame or another frame of a segment may be analyzed for an artifact risk. The device may assign the banding index of the analyzed frame to the entire segment or to any frame in the segment. The device may determine whether a number of pixels in a group of pixels exceeds a threshold and/or whether the brightness or luminance values of a number of pixels in a group of pixels satisfies a threshold value. The device may determine whether an average or mean brightness of all or a subset of pixels in a group of pixels satisfies a threshold. To identify blocks of pixels which may exhibit visible banding artifacts, the device may divide any video frame into blocks, evaluate the blocks for visible banding artifacts, and determine when a number blocks of a frame likely to exhibit banding artifacts exceeds a threshold number of blocks (e.g., a threshold area of a frame). If the number of adjacent blocks in a frame exhibiting banding artifacts is greater than a threshold, then the artifact risk of a frame and the corresponding segment may be high (e.g., the artifact may be more visible because it is larger given the number of adjacent or contiguous blocks exhibiting possible artifacts).

At block 306, the device may determine whether the artifact risk is greater than a threshold amount of risk. The device may determine a score of a segment or frame in a segment based on the banding index (e.g., a quality score may be higher when the banding index is lower). The device may determine if the quality score exceeds a quality threshold, or may determine if the banding index is greater than an artifact threshold. If the quality score exceeds a quality score threshold or if the banding index is less than an artifact threshold, the process 300 may continue to block 308. If the quality score is less than a quality score threshold or if the banding index exceeds an artifact threshold, the process 300 may continue at block 310. The device may use multiple thresholds. For example, an artifact risk may be higher than one threshold and lower than another threshold (e.g., within a risk range). The range of risk corresponding to whether an artifact risk is above or below one or more risk thresholds may be used to determine which set of encoding parameters to apply in a second encoding pass.

At block 308, the device may cause the selection of more aggressive encoding parameters for use in a second encoding pass of the encoded video segment (e.g., more aggressive than the parameters used in the first encoding pass and/or more aggressive than other available encoding parameters). For example, if the artifact risk for banding or other artifacts is low, then more aggressive compression settings may be used in the second encoding pass because the more significant (e.g., lossy) compression using in the second encoding pass may be unlikely to produce visible artifacts when the encoded video segment is decoded and rendered. The device may consider other factors when determining how significant the compression settings may be for a second encoding pass. For example, the device may consider network conditions, display size, device capabilities, processing resources, and other relevant information in determining how significantly to compress video frames (e.g., in combination with consideration of the artifact risk). Causing selection of encoding parameters may include selecting the parameters for an encoder (e.g., selection of an encoding profile including encoding parameters and/or indicating compression artifact risk), recommending encoding parameters, and/or indicating the banding risk (e.g., using a profile) to an encoder for selection of parameters. A profile based on compression artifact risk may be used to identify the encoding parameters to use in a second pass of encoding.

At block 310, the device may cause the selection of less aggressive encoding parameters for use in a second encoding pass of the encoded video segment (e.g., less aggressive than the parameters used in the first encoding pass and/or less aggressive than other available encoding parameters). For example, if the artifact risk for banding or other artifacts is high, then less aggressive compression settings may be used in the second encoding pass because more significant (e.g., lossy) compression using in the second encoding pass may be likely to produce visible artifacts when the encoded video segment is decoded and rendered. The device may consider other factors when determining how significant the compression settings may be for a second encoding pass. For example, the device may consider network conditions, display size, device capabilities, processing resources, and other relevant information in determining how significantly to compress video frames (e.g., in combination with consideration of the artifact risk). Causing selection of encoding parameters may include selecting the parameters for an encoder, recommending encoding parameters, and/or indicating the banding risk to an encoder for selection of parameters. The selection of coding parameters for the second encoding pass may be based on machine learning. For example, even if less aggressive encoding parameters were used on video segments with a similar or the same artifact risk, if the device receives feedback indicative of visible artifacts during playback of the segment, the device may select even less aggressive encoding parameters for video segments with a similar artifact risk, and/or may change criteria (e.g., adjust the thresholds for determining the significance of an artifact risk) which may be used to determine which set of coding parameters to use. Referring to blocks 308 and 310, the second pass encoding may include further encoding the encoded video segments after the first pass encoding, or encoding the video segments (e.g., the un-encoded version of the video segments) using different encoding parameters.

Figure 4:
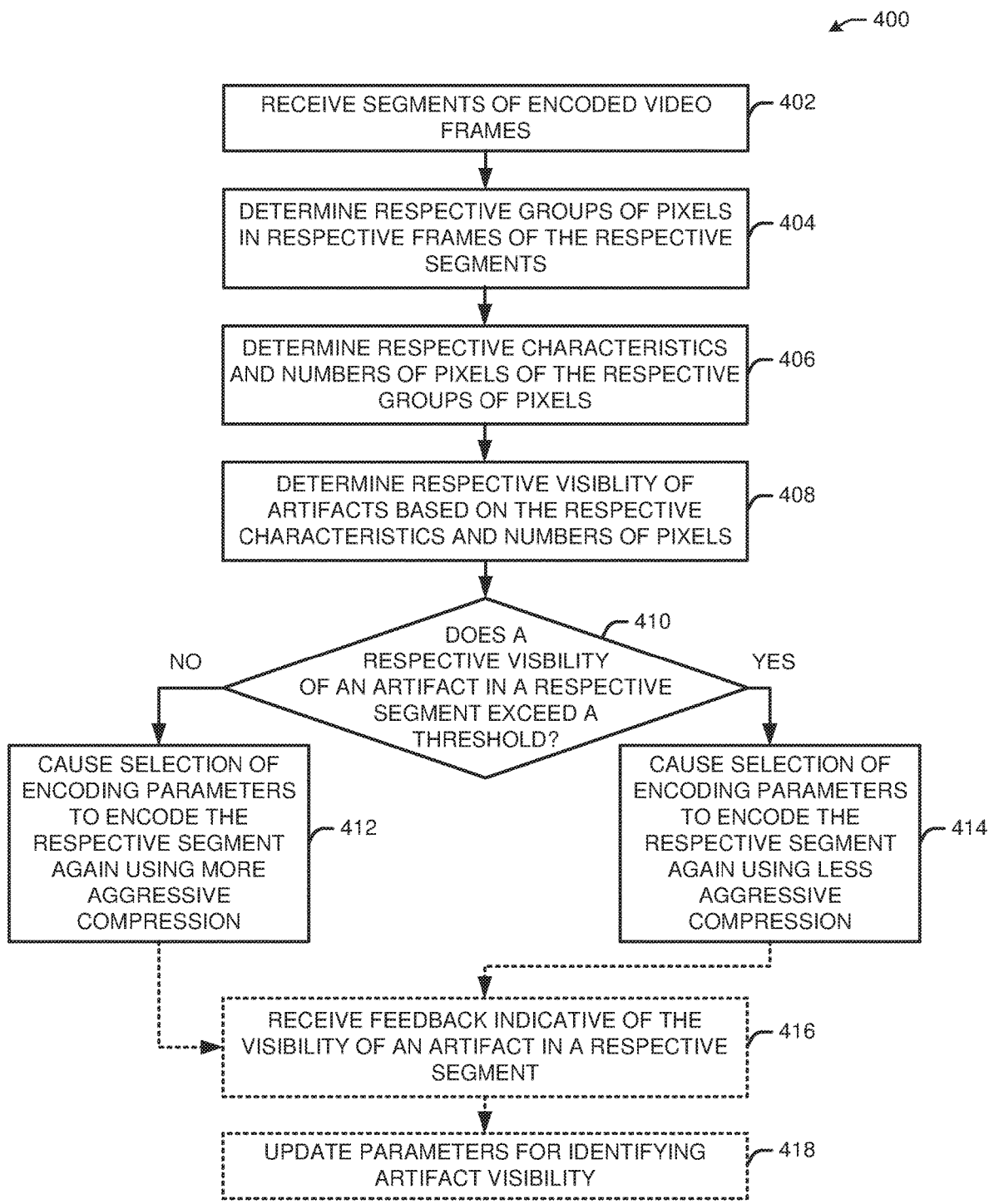
FIG. 4 illustrates a flow diagram for a process for adaptive multi-pass risk-based video encoding, in accordance with one or more example embodiments of the present disclosure.

FIG. 4 illustrates a flow diagram for a process 400 for adaptive multi-pass risk-based video encoding, in accordance with one or more example embodiments of the present disclosure.

At block 402, a device (e.g., the one or more machine learning modules 218 of FIG. 2) may receive segments of encoded video frames (e.g., the frames 214 encoded by the encoder 216 of FIG. 2) and/or video data such as pixel values or characteristics of encoded video frames of a video segment. Video data may be associated with an encoded portion of a video segment encoded using first encoding parameters, and the encoded portion of the video segment may include a one or more video frames The frames may have been encoded in a first pass, and the device may analyze the encoded frames for further encoding before the encoded frames are sent to one or more devices (e.g., the one or more devices 202 of FIG. 2) for playback. The device may receive multiple segments of video, which may correspond to a video file (e.g., a movie or show). A segment may correspond to a scene, a camera angle, or some amount of frames which may include one or more reference frames to facilitate decoding of one or more inter frames. The device may receive one or more encoded segments while other segments are being encoded in a first pass, or may receive encoded segments after all segments of a file have been encoded in a first pass.

At block 404, the device may determine, using one or more encoded video frames of a respective segment and/or the video data, one or more groups of pixels in the respective encoded video frames being adjacent to one another and having similar pixel values. For example, the device may identify a group of pixels in a coded video frame, the group of pixels having been identified with an object or with an area of the frame exhibiting particular colors, brightness, luminance, or other visual characteristics. The device may identify one or multiple groups of pixels in one frame of a segment, or may identify one or multiple groups of pixels in multiple frames of a segment. The groups or islands of pixels may have a similar luminance and may be at risk of banding or other compression artifacts. The device may divide a video frame into blocks and may evaluate the blocks for compression artifact risk.

At block 406, the device may determine the characteristics of respective groups of pixels in the one or more frames analyzed for a segment. Characteristics of pixels associated with compression artifact risk may include brightness, contrast, edge characteristics (e.g., edge sharpness), and other pixel values. For example, darker (e.g., low luma) groups of pixels may be at higher risk for banding or other compression artifacts. At block 408, the device may determine the respective visibility of artifacts based on pixel characteristics, the number of pixels in a group (e.g., how large an island of pixels is), and other factors. The device may identify (e.g., through machine learning) and distinguish smooth, low luma or low gradient regions with visible contours arising due to quantization from smooth, low luma or low gradient regions with visible contours arising due to quantization. Regions with higher risk of banding or other artifacts may include smooth, dark screens/walls, skies with gentle gradient, and low luma (dark) regions with little texture like dark trench coats. Regions with significantly high spatial frequency components may be less risky with respect to banding/blocking. Such regions may include freckles on faces, hair, scenes with vegetation, and congested or urban scenes. Given such information, the device may assign an artifact index (e.g., a banding index) to a segment based on the visibility of an artifact in one or more frames of the segment. The device may determine whether a number of respective brightness values of respective pixels is below a brightness threshold, or whether an average or mean value of all or a subset of pixels in a group of pixels is below a brightness threshold.

At block 410, the device may determine if the respective visibility of an artifact or multiple artifacts in a frame of a segment exceeds a visibility threshold indicative of how likely it may be for a viewer to notice the artifact. If the banding index exceeds an artifact threshold, for example, the device may determine that a segment is likely to exhibit a visible artifact (e.g., the device may assign a lower quality score to the segment and may determine whether the quality score of a segment exceeds a quality threshold). The lower the risk for an artifact, the higher the quality of a segment, and the more likely the segment may be to exhibit a noticeable compression artifact with more significant compression parameters. If the visibility of one or more artifacts in one or more frames of a segment is below a threshold (or if the quality score of a segment exceeds a threshold), the process 400 may continue to block 412. If the visibility of one or more artifacts in one or more frames of a segment is below a threshold (or if a quality score of a segment exceeds a threshold), the process 400 may continue to block 414.

At block 412, the device may cause the selection of more aggressive encoding parameters for encoding the coded video segment in a second pass (e.g., more aggressive than the parameters used in the first encoding pass and/or more aggressive than other available encoding parameters). For example, a more aggressive encoding scheme may result in more bitrate savings, but may be more lossy than a coding scheme which results in less bitrate savings (e.g., using less compression of video data). A more aggressive encoding scheme may be used when a display size is smaller, when devices have less processing power or resources, when bandwidth is lower, when more compression is needed to maintain a download speed, and based on other considerations. Segments may be encoded with a more aggressive encoding scheme by default unless the segments exhibit significant compression artifact risk, for example. Causing the selection of more aggressive encoding parameters may include the device selecting the parameters for the encoder to use in a second encoding pass (e.g., selecting a profile including the encoding parameters or compression artifact risk), recommending encoding parameters (e.g., by sending a profile), and/or indicating to an encoder the compression artifact risk or quality score of a segment (e.g., by sending a profile indicating the compression artifact risk). A profile of a segment may indicate to an encoder which parameters to use for encoding.

At block 414, the device may cause the selection of less aggressive encoding parameters for encoding the coded video segment in a second pass (e.g., less aggressive than the parameters used in the first encoding pass and/or less aggressive than other available encoding parameters). For example, a less aggressive encoding scheme may result in less bitrate savings, but may be less lossy than a coding scheme which results in more bitrate savings (e.g., using more compression of video data). A less aggressive encoding scheme may be used when a display size is larger, when definition of video may be higher, when devices have more processing power or resources, when bandwidth is wider, when less compression is needed to maintain a download speed, and based on other considerations. Causing the selection of less aggressive encoding parameters may include the device selecting the parameters for the encoder to use in a second encoding pass, recommending encoding parameters, and/or indicating to an encoder the compression artifact risk or quality score of a segment. Referring to blocks 412 and 414, the second pass encoding may include further encoding the encoded video segments after the first pass encoding, or encoding the video segments (e.g., the un-encoded version of the video segments) using different encoding parameters.

At block 416, the device may receive feedback indicative of the visibility of a compression artifact in a respective video segment. The feedback may come from user feedback and/or from analysis performed by one or more other devices or systems. The feedback may indicate that a compression artifact is visible when the device may have determined that the banding index of a segment was low and that the segment could be encoded aggressively. The feedback may indicate that a compression artifact is not visible.

At block 418, the device may update parameters for identifying compression artifact visibility. For example, the device may adjust thresholds used to compare to the banding indices to determine how aggressively to encode a segment in a second pass of encoding. Adjusting the parameters may include adjusting a minimum number of pixels in a pixel block exhibiting banding artifact qualities (e.g., low brightness or entropy) and/or adjusting the level or range of brightness associated with banding or other artifacts. When the device determines that a segment exhibited significantly visible compression artifacts, the device may adjust the strength of compression (e.g., encode less aggressively) when that segment or another segment has the same or similar banding index. The device may determine that a banding index should be higher or lower before using different encoding parameters in a second pass of encoding. Such determinations may be performed as part of one or more machine learning algorithms, which may result in the functions of neural network nodes changing based on analysis of video segments.

Figure 5:
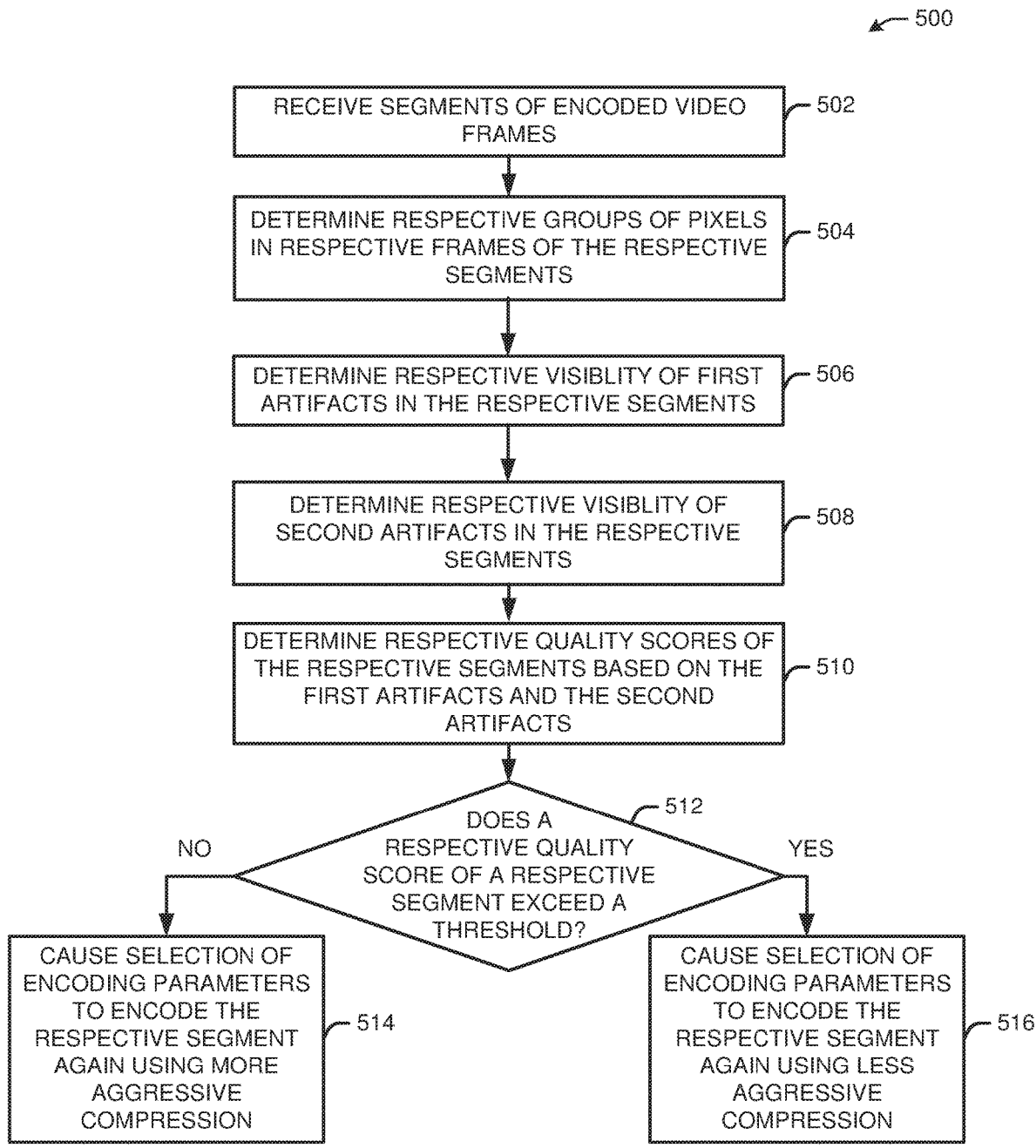
FIG. 5 illustrates a flow diagram for a process for adaptive multi-pass risk-based video encoding, in accordance with one or more example embodiments of the present disclosure.

FIG. 5 illustrates a flow diagram for a process 500 for adaptive multi-pass risk-based video encoding, in accordance with one or more example embodiments of the present disclosure.

At block 502, a device (e.g., the one or more machine learning modules 218 of FIG. 2) may receive segments of encoded video frames (e.g., the frames 214 encoded by the encoder 216 of FIG. 2) and/or video data such as pixel values or characteristics of encoded video frames of a video segment. Video data may be associated with an encoded portion of a video segment encoded using first encoding parameters, and the encoded portion of the video segment may include a one or more video frames The frames may have been encoded in a first pass, and the device may analyze the encoded frames for further encoding before the encoded frames are sent to one or more devices (e.g., the one or more devices 202 of FIG. 2) for playback. The device may receive multiple segments of video, which may correspond to a video file (e.g., a movie or show). A segment may correspond to a scene, a camera angle, or some amount of frames which may include one or more reference frames to facilitate decoding of one or more inter frames. The device may receive one or more encoded segments while other segments are being encoded in a first pass, or may receive encoded segments after all segments of a file have been encoded in a first pass.

At block 504, the device may determine, using one or more encoded video frames of a respective segment and/or the video data, one or more groups of pixels in the respective encoded video frames being adjacent to one another and having similar pixel values. For example, the device may identify a group of pixels in a coded video frame, the group of pixels having been identified with an object or with an area of the frame exhibiting particular colors, brightness, luminance, or other visual characteristics. The device may identify one or multiple groups of pixels in one frame of a segment, or may identify one or multiple groups of pixels in multiple frames of a segment. The groups or islands of pixels may have a similar luminance and may be at risk of banding or other compression artifacts. The device may divide a frame into multiple blocks (e.g., portions) and may evaluate the blocks for compression artifact risk.

At block 506, the device may determine the respective visibility of a first artifact in a respective video segment (e.g., in a frame of a segment). At block 508, the device may determine the respective visibility of a second artifact in a video segment (e.g., a frame of a segment may exhibit multiple compression artifacts, such as banding and blocking). The first and second artifacts may be the same type of artifact (e.g., banding) and may be analyzed using the same criteria (e.g., number of pixels in a group and their luminance and/or other pixel characteristics) or may be analyzed using different respective criteria based on the type of artifact (e.g., an analysis of banding artifacts and of blocking artifacts). The device may identify (e.g., through machine learning) and distinguish smooth, low luma or low gradient regions with visible contours arising due to quantization from smooth, low luma or low gradient regions with visible contours arising due to quantization. Regions with higher risk of banding or other artifacts may include smooth, dark screens/walls, skies with gentle gradient, and low luma (dark) regions with little texture like dark trench coats. Regions with significantly high spatial frequency components may be less risky with respect to banding/blocking. Such regions may include freckles on faces, hair, scenes with vegetation, and congested or urban scenes. Given such information, the device may assign an artifact index (e.g., a banding index, a blocking index, etc.) to a segment based on the visibility of respective artifacts in one or more frames of the segment. The device may determine whether a number of pixels in a group of pixels has respective brightness values less than a threshold, or whether an average or mean of pixel brightness values of all or a subset of pixels in a group of pixels satisfies a brightness value.

At block 510, the device may determine respective quality scores of video segments based on the respective visibilities of first and second artifacts in frames of a respective coded video segment. Quality scores may indicate the likelihood of a segment exhibiting one or more visible compression artifacts. For example, higher banding or other artifact indices may result in a lower quality score, as may a segment with significant areas having low luminance (e.g., video frames which have significant areas with low brightness or low entropy). The device may assign quality scores (e.g., from 0-1 with 1 being higher quality) based on the compression artifact indices and other factors. The higher the quality score of a segment, the more likely the segment may be to experience significant compression in a second pass of encoding without resulting in visible compression artifacts.

At block 512, the device may determine whether respective quality scores of video segments exceed quality score thresholds. The device may compare quality scores to multiple thresholds (e.g., for low, medium, and high quality) to determine a quality range associated with encoding parameters to apply to the coded segment in a second pass of video coding. If the quality score of a segment does not exceed a score threshold (e.g., the banding or other compression artifact visibility risk of the segment may be high), the process 500 may continue to block 514. If the quality score of a segment exceeds a score threshold (e.g., the banding or other compression artifact visibility risk of the segment may be low), the process 500 may continue to block 516.

At block 514, the device may cause the selection of more aggressive encoding parameters for encoding the coded video segment in a second pass (e.g., more aggressive than the parameters used in the first encoding pass and/or more aggressive than other available encoding parameters). For example, a more aggressive encoding scheme may result in more bitrate savings, but may be more lossy than a coding scheme which results in less bitrate savings (e.g., using less compression of video data). A more aggressive encoding scheme may be used when a display size is smaller, when devices have less processing power or resources, when bandwidth is lower, when more compression is needed to maintain a download speed, and based on other considerations. Segments may be encoded with a more aggressive encoding scheme by default unless the segments exhibit significant compression artifact risk, for example. Causing the selection of more aggressive encoding parameters may include the device selecting the parameters for the encoder to use in a second encoding pass (e.g., sending the parameters or sending a profile including the parameters), recommending encoding parameters, and/or indicating to an encoder the compression artifact risk or quality score of a segment (e.g., sending a profile indicating the risk associated with encoding more aggressively or less aggressively).

At block 516, the device may cause the selection of less aggressive encoding parameters for encoding the coded video segment in a second pass (e.g., less aggressive than the parameters used in the first encoding pass and/or less aggressive than other available encoding parameters). For example, a less aggressive encoding scheme may result in less bitrate savings, but may be less lossy than a coding scheme which results in more bitrate savings (e.g., using more compression of video data). A less aggressive encoding scheme may be used when a display size is larger, when definition of video may be higher, when devices have more processing power or resources, when bandwidth is wider, when less compression is needed to maintain a download speed, and based on other considerations. Causing the selection of less aggressive encoding parameters may include the device selecting the parameters for the encoder to use in a second encoding pass, recommending encoding parameters, and/or indicating to an encoder the compression artifact risk or quality score of a segment. Referring to blocks 514 and 516, the second pass encoding may include further encoding the encoded video segments after the first pass encoding, or encoding the video segments (e.g., the un-encoded version of the video segments) using different encoding parameters.

Referring to FIGS. 3-5, the device may consider multiple groups or islands of pixels in a single frame or across multiple frames of a segment when assessing the visibility of compression artifacts. The device may identify a portion of a frame or segment most likely to exhibit a compression artifact in a segment or frame with the highest visibility, and may assign an artifact index to a segment based on the most visible compression artifact. The device may identify multiple portions of a frame likely to exhibit a compression artifact, and may determine a score of a frame or segment based on a combination of the risk of artifact visibility. For example, if multiple regions of a frame may exhibit a compression artifact, the device may add or average the respective artifact indices of the regions and assign a score to the frame or segment based on the sum or average. The device may determine multiple artifact visibility risks of a segment corresponding to multiple artifact indices, and may encode different segments of individual frames based on the likelihood that specific regions of a frame may exhibit visible compression artifacts.

Figure 6:
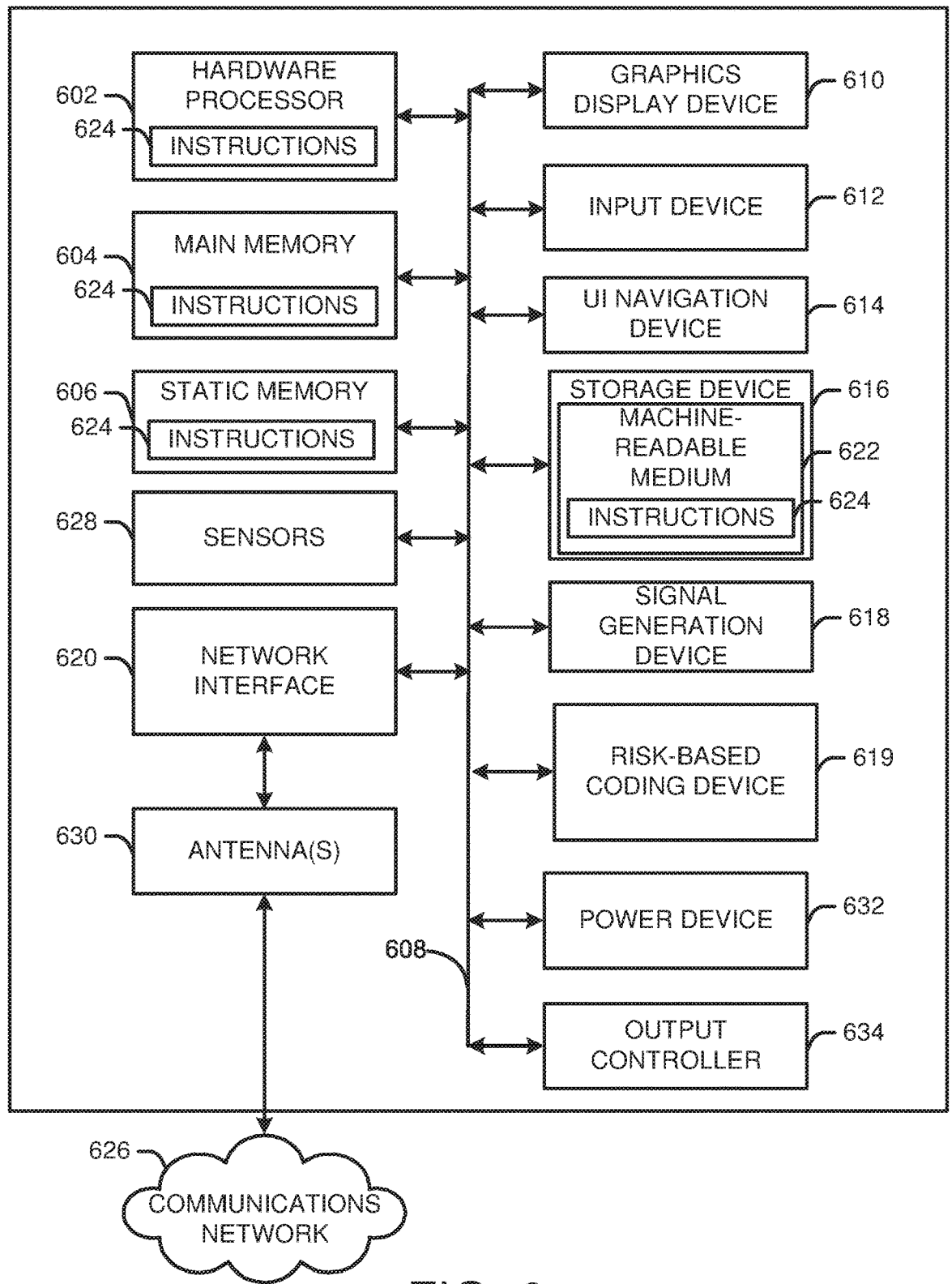
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., one or more user devices 202, the one or more machine learning modules 218, the video server 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., an emitter, a speaker), a risk-based coding device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The risk-based coding device 619 may carry out or perform any of the operations and processes (e.g., process 300 of FIG. 3, process 400 of FIG. 4, process 500 of FIG. 5) described and shown above.

In one or more embodiments, the risk-based coding device 619 may be implemented as a decoder (e.g., the decoder 240 of FIG. 2) when implemented in a device which receives and renders encoded streaming video. When so implemented, the risk-based coding device 619 may facilitate the decoding and playback of encoded video frames.

In one or more embodiments, the risk-based coding device 619 may be implemented as part of a video server (e.g., the video server 210 of FIG. 2). In particular, the risk-based coding device 619 may be implemented as part of or in communication with a neural network (e.g., the one or more machine learning modules 218 of FIG. 2). In one or more embodiments, the risk-based coding device 619 may operate with a video encoder (e.g., a processor) to assess the compressed artifact risk of video segments and determine which encoding parameters to apply (e.g., more aggressive or less aggressive parameters) based on the risk. The risk-based coding device 619 may receive video frames encoded by the encoder (e.g., a first pass of video encoding), may determine the risk of a coded video segment having an artifact, and may recommend encoding parameters for a second round of encoding of the video segments (e.g., a second pass of video encoding) based on the risk.

In one or more embodiments, the risk-based coding device 619 may analyze any one or more frames of a segment of a video file. The risk-based coding device 619 may be trained, for example, by receiving user inputs indicating the visibility of banding and other artifacts in a given video frame or segment. Once trained, the risk-based coding device 619 may analyze video frames without additional user input to determine an index indicative of the visibility of an artifact in a video frame or segment. For example, the risk-based coding device 619 may analyze a video frame of a segment of video frames, and based on the index, may assign a score indicative of the quality of the video segment based on the quality of the analyzed video frame of the segment (e.g., a higher score may indicate a higher quality image with less visibility of one or more artifacts).

In one or more embodiments, the risk-based coding device 619 may identify (e.g., using a traversal algorithm or otherwise) contiguous "islands" or groups of pixels with the same or similar luminance and having a banding risk (e.g., a risk of banding which exceeds a risk threshold). The fraction of a video frame susceptible to banding or other artifacts may be assigned a banding index (or another respective index associated with the type of artifact). The risk-based coding device 619 may assign the banding index or other index, and may determine whether the index exceeds a threshold (e.g., risk threshold associated with a type of artifact). When the index of an encoded video frame exceeds a respective artifact risk threshold, the risk-based coding device 619 may classify the segment as higher risk. When the index of an encoded video frame does not exceed a respective artifact risk threshold, the risk-based coding device 619 may classify the segment as lower risk. The risk-based coding device 619 may use multiple thresholds (e.g., for high, medium, and low risks) to classify segments of video frames based on the respective index of a frame in a respective video segment. The risk-based coding device 619 may provide the encoder with the risk classifications, and the encoder may select encoding parameters for a second pass of encoding the video segments based on the risk classifications for one or more artifacts.

In one or more embodiments, the risk-based coding device 619 and one or more encoders may be part of a video pipeline used by one or more servers (e.g., a remote network provider) which provide streaming video. The risk-based coding device 619 may analyze segments of encoded video while other segments of the same video file are still being encoded in a first pass, or the neural network may wait to assess encoded video segments after all segments of a video file have been encoded. The encoder (e.g., implemented as part of the risk-based coding device 619, the hardware processor 602, another processor of the machine 600, implemented in a separate device from the machine 600) may encode coded video segments a second time based on the risk assessment or recommended encoding parameters provided by the risk-based coding device 619 while the risk-based coding device 619 assesses video segments which have been encoded by the encoder in a first pass, or the encoder may wait until the risk-based coding device 619 has assessed the artifact risk of all segments of a video file after a first pass of encoding before encoding the video segments with a second pass using the risk-based encoding parameters. Once video segments have been encoded twice using the risk-based approach, the video segments may be transmitted using the video pipeline to one or more devices capable of receiving and playing the streaming video.

In one or more embodiments, the risk-based coding device 619 may determine a banding index of a video segment based on an analysis of one or more variables of a video frame in the segment. For example, the visibility of a banding artifact may correspond to the size of a pixel block or island with the same or similar luminance (e.g., intensity), and/or may correspond to the brightness (e.g., amplitude and wavelength) of the pixel block or island which may be subject to banding. The risk-based coding device 619 may determine that larger, less bright islands of pixels in a video frame may correspond to increased chance of visibility of a banding artifact, and may assign a video segment having the video frame an index indicative of a higher banding visibility (e.g., a score between 0 and 1, with 1 being the highest risk of banding visibility). When a video segment has a higher banding index, the risk-based coding device 619 may recommend or select a less-lossy set of encoding parameters to use in a second encoding pass than when a video segment has a lower banding index. The risk-based coding device 619 may evaluate groups of pixels in video frames for pixel characteristics which may be indicative of compression artifact risk. Such characteristics may include brightness, variance, edge sharpness, contrast, and other pixel values.

It is understood that the above are only a subset of what the risk-based coding device 619 may be configured to perform and that other functions included throughout this disclosure may also be performed by the risk-based coding device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:

receiving two or more segments of video frames, wherein the two or more segments of video frames are encoded using first encoding parameters, and wherein the two or more segments of video frames comprise a first video frame associated with a first segment and a second video frame associated with a second segment;

determining a first group of pixels in the first video frame, and wherein respective pixels of the first group of pixels are adjacent to at least one pixel in the first group of pixels;

determining a second group of pixels in the second video frame, and wherein respective pixels of the second group of pixels are adjacent to at least one pixel in the second group of pixels;

determining a first characteristic of a first pixel in the first group of pixels;

determining a second characteristic of a second pixel in the second group of pixels;

determining, based on the first characteristic, a first score, wherein the first score is indicative of a first visibility of a first banding artifact;

determining, based on the second characteristic, a second score, wherein the second score is indicative of a second visibility of a second banding artifact;

determining that the first score exceeds a threshold score;

determining that the second score fails to exceed the threshold score;

determining, based on the first score exceeding the threshold score, second encoding parameters, wherein the second encoding parameters are associated with encoding the first segment; and determining, based on the second score failing to exceed the threshold score, third encoding parameters, wherein the third encoding parameters are associated with encoding the second segment, wherein the second encoding parameters are associated with a first bit rate, wherein the third encoding parameters are associated with a second bit rate, and wherein the first bit rate is different from the second bit rate.

2. The method of claim 1, wherein the first group of pixels comprises a first number of pixels, wherein the second group of pixels comprises a second number of pixels, wherein determining the first score is further based on the first number of pixels, wherein the second score is based on the second number of pixels, and wherein the first number of pixels is greater than the second number of pixels.

3. The method of claim 1, further comprising:
determining a third group of pixels in the first video frame; and
determining a third characteristic of a third pixel in the third group of pixels, wherein determining the first score is further based on the third characteristic.

4. The method of claim 1, wherein the first banding artifact is a first compression artifact associated with the second encoding parameters, and wherein the second banding artifact is a second compression artifact associated with the third encoding parameters, further comprising determining one or more additional compression artifacts associated with the first video frame, wherein the first score is further based on the one or more additional compression artifacts.

5. A method, comprising:
receiving video data, wherein the video data is associated with an encoded portion of a video segment encoded using first encoding parameters, and wherein the encoded portion of the video segment comprises a first video frame;
determining, based on the video data, a group of pixels in the first video frame, wherein the group of pixels comprises a compression artifact;
determining, based on respective characteristics of two or more pixels in the group of pixels, a score indicative of a visibility of the compression artifact in the first video frame, wherein the respective characteristics comprise at least one of a brightness or a contrast associated with the group of pixels; and
determining, based on the score, second encoding parameters for encoding the video segment.

6. The method of claim 5, wherein the score is a first score, wherein determining the second encoding parameters comprises determining that the score fails to meet a threshold score, wherein the second encoding parameters are associated with less compression than the first encoding parameters.

7. The method of claim 5, wherein determining the second encoding parameters comprises determining that the score exceeds a threshold score, wherein the second encoding parameters are associated with more compression than the first encoding parameters.

8. The method of claim 5, wherein determining the score comprises determining that an average characteristic of the group of pixels fails to exceed a threshold.

9. The method of claim 5, further comprising:
determining at least one of the brightness or the contrast associated with the group of pixels; and
determining the visibility of the compression artifact based on the at least one of the brightness or the contrast.

10. The method of claim 5, wherein the video segment is a first video segment of a video file, wherein the video file comprises a second video segment, wherein the second video segment comprises a second video frame, wherein the group of pixels is a first group of pixels, wherein the compression artifact is a first compression artifact, and wherein the score is a first score, the method further comprising:
determining a second group of pixels in the second video frame;
determining, based on respective characteristics of two or more pixels in the second group of pixels, a second score indicative of a second visibility of a second compression artifact in the second video frame;
determining that the first score exceeds a threshold score, wherein determining the second encoding parameters is based on the first score exceeding the threshold score;
determining that the second score fails to exceed the threshold score;
determining third encoding parameters associated with encoding the second video segment, wherein the third encoding parameters are associated with more compression than the second encoding parameters; and
sending an indication of the third encoding parameters.

11. The method of claim 5, wherein the group of pixels is a first group of pixels, wherein the compression artifact is a first compression artifact, and wherein determining the score further comprises determining a second group of pixels in the first video frame, wherein the second group of pixels comprises a second compression artifact, wherein determining the score is further based on a respective brightness of two or more pixels in the second group of pixels.

12. The method of claim 5, wherein the video segment is a first video segment of a video file, wherein the video file comprises a second video segment, wherein the first video frame is a keyframe of the first video segment, wherein the keyframe is associated with a scene change between the second video segment and the first video segment.

13. The method of claim 5, wherein the compression artifact is a first compression artifact associated with the second encoding parameters, further comprising determining one or more additional compression artifacts associated with the first video frame, wherein the first compression artifact is different from the one or more additional compression artifacts, and wherein the score is further based on the one or more additional compression artifacts.

14. The method of claim 5, wherein the compression artifact is a first compression artifact associated with the second encoding parameters, and wherein the score is a first score, further comprising:
determining one or more additional compression artifacts associated with the first video frame; and determining, based on the one or more additional compression artifacts, a second score associated with the video segment, wherein the second score is indicative of a second visibility of the one or more additional compression artifacts, and wherein determining the second encoding parameters is further based on the second score.

15. The method of claim 5, wherein the video segment is a first video segment of a video file, wherein the video file comprises a second video segment, wherein the second video segment comprises a second video frame, wherein the group of pixels is a first group of pixels, and wherein the compression artifact is a first compression artifact, the method further comprising:
   determining a second group of pixels in the second video frame, wherein the second group of pixels comprises a second compression artifact; and
   determining, based on the second compression artifact, a third set of encoding parameters associated with encoding the second video segment, wherein determining the third set of encoding parameters occurs after the encoding of the first video segment using the second encoding parameters.

16. The method of claim 5, wherein the video segment is a first video segment of a video file, wherein the video file comprises a second video segment, wherein the second video segment comprises a second video frame, wherein the group of pixels is a first group of pixels, and wherein the compression artifact is a first compression artifact, the method further comprising:
   determining a second group of pixels in the second video frame, wherein the second group of pixels comprises a second compression artifact; and
   determining, based on the second compression artifact, a third set of encoding parameters associated with encoding the second video segment, wherein determining the third set of encoding parameters occurs before the encoding of the first video segment using the second encoding parameters.

17. The method of claim 5, wherein determining the second encoding parameters comprises determining the second encoding parameters using a neural network, and wherein receiving the video segment comprises receiving, at the neural network, the video segment from an encoder.

18. The method of claim 17, further comprising receiving, at the neural network, user input associated with visibility of the compression artifact, wherein determining the score is further based on the user input.

19. A device comprising memory coupled to at least one processer, the at least one processor configured to:
   receive video data, wherein the video data is associated with an encoded portion of a video segment encoded using first encoding parameters, and wherein the encoded portion of the video segment comprises a first video frame;
   determine, based on the video data, a group of pixels in the first video frame, wherein the group of pixels comprises a compression artifact;
   determine, based on respective characteristics of two or more pixels in the group of pixels, a score indicative of a visibility of the compression artifact in the first video frame, wherein the respective characteristics comprise at least one of a brightness or a contrast associated with the group of pixels; and
   determine, based on the score, second encoding parameters for encoding the video segment.

20. The device of claim 19, wherein the score is a first score, wherein to determine the second encoding parameters comprises to determine that the score fails to meet a threshold score, wherein the second encoding parameters are associated with less compression than the first encoding parameters.

* * * * *